US009920193B2

(12) United States Patent
Echigo et al.

(10) Patent No.: US 9,920,193 B2
(45) Date of Patent: Mar. 20, 2018

(54) METHOD FOR PRODUCING POLYVINYLIDENE DIFLUORIDE PARTICLES, AND POLYVINYLIDENE DIFLUORIDE PARTICLES

(71) Applicant: TORAY INDUSTRIES, INC., Tokyo (JP)

(72) Inventors: Yuji Echigo, Nagoya (JP); Makiko Saito, Tokyo (JP); Itaru Asano, Nagoya (JP); Yoko Wakahara, Otsu (JP); Hiroshi Takezaki, Nagoya (JP)

(73) Assignee: TORAY INDUSTRIES, INC., Tokyo (JP)

( * ) Notice: Subject to any disclaimer, the term of this patent is extended or adjusted under 35 U.S.C. 154(b) by 36 days.

(21) Appl. No.: 14/421,304

(22) PCT Filed: Aug. 26, 2013

(86) PCT No.: PCT/JP2013/072650
§ 371 (c)(1),
(2) Date: Feb. 12, 2015

(87) PCT Pub. No.: WO2014/034581
PCT Pub. Date: Mar. 6, 2014

(65) Prior Publication Data
US 2015/0218359 A1 Aug. 6, 2015

(30) Foreign Application Priority Data
Aug. 26, 2013 (JP) .................................. 2012-190095

(51) Int. Cl.
B32B 5/16 (2006.01)
C08L 27/16 (2006.01)
(Continued)

(52) U.S. Cl.
CPC .............. *C08L 27/16* (2013.01); *C08F 14/18* (2013.01); *C08J 3/124* (2013.01); *C08J 3/16* (2013.01);
(Continued)

(58) Field of Classification Search
CPC ........ C08J 3/03; C08J 3/09; C08J 3/14; Y10T 428/2982
See application file for complete search history.

(56) References Cited

U.S. PATENT DOCUMENTS

2001/0003127 A1  6/2001  Tsuda et al.
2003/0170538 A1* 9/2003  Miyaki .................... C08F 8/26
                                                            429/217
(Continued)

FOREIGN PATENT DOCUMENTS

EP    1456281 B1    11/2005
EP    1803749 A1    7/2007
(Continued)

OTHER PUBLICATIONS

Luo & Ma, Fabrication of microporous PVDF particles by an emulsion method and control of pore structure, Adv. Mater. Res. vol. 560-561 (2012) pp. 751-755.*
(Continued)

*Primary Examiner* — Hoa T Le
(74) *Attorney, Agent, or Firm* — Birch, Stewart, Kolasch & Birch, LLP (57) ABSTRACT

Provided are: fine vinylidene fluoride resin particles which are solid and have an average particle diameter of 0.3 μm or more but less than 100 μm, a particle diameter distribution index of 1-2, a repose angle of less than 40°, and an average sphericity of 80 or more said fine vinylidene fluoride par-
(Continued)

ticles being suitable for coating materials and coating applications; and a method for producing the fine vinylidene fluoride resin particles.

13 Claims, 1 Drawing Sheet

(51) Int. Cl.
　　*C08J 3/16* (2006.01)
　　*C08J 3/12* (2006.01)
　　*C08L 1/28* (2006.01)
　　*C08L 71/02* (2006.01)
　　*C08F 14/18* (2006.01)

(52) U.S. Cl.
　　CPC .............. *C08L 1/284* (2013.01); *C08L 71/02* (2013.01); *C08J 2327/16* (2013.01); *Y10T 428/2982* (2015.01)

(56) References Cited

U.S. PATENT DOCUMENTS

| | | |
|---|---|---|
| 2008/0047671 A1 | 2/2008 | Vandenhende |
| 2009/0087463 A1 | 4/2009 | Yagyu et al. |
| 2011/0070442 A1 | 3/2011 | Asano et al. |
| 2013/0183528 A1 | 7/2013 | Echigo et al. |

FOREIGN PATENT DOCUMENTS

| | | |
|---|---|---|
| EP | 2495273 A1 | 9/2012 |
| EP | 2752440 A1 | 7/2014 |
| JP | 7-90153 A | 4/1995 |
| JP | 9-165535 A | 6/1997 |
| JP | 11-184164 A | 7/1999 |
| JP | 2001-114901 A | 4/2001 |
| JP | 2003-82295 A | 3/2003 |
| JP | 2003-306551 A | 10/2003 |
| JP | 2007-308811 A | 11/2007 |
| JP | 2008-070577 A | 3/2008 |
| JP | 2009-83437 A | 4/2009 |
| JP | 2011-177614 A | 9/2011 |
| JP | 2011-231273 A | 11/2011 |
| JP | 2012-511074 A | 5/2012 |
| WO | WO 2007/119395 A1 | 10/2007 |
| WO | WO 2009/142231 A1 | 11/2009 |
| WO | WO 2010/063810 A1 | 6/2010 |
| WO | WO 2011/052669 A1 | 5/2011 |
| WO | WO 2012/043509 A1 | 4/2012 |

OTHER PUBLICATIONS

Machine translation JP 2001-114,901 (2001).*
Teng, Overview of the development of the fluoropolymer industry, Appl. Sci. 2012, 2, 496-512.*
Extended European Search Report dated Mar. 9, 2016, for European Application No. 13833331.5.
Japanese Office Action dated Feb. 10, 2015, for Japanese Application No. 2013-540565.

* cited by examiner

METHOD FOR PRODUCING POLYVINYLIDENE DIFLUORIDE PARTICLES, AND POLYVINYLIDENE DIFLUORIDE PARTICLES

TECHNICAL FIELD OF THE INVENTION

The present invention relates to a method for producing polyvinylidene difluoride particles and to polyvinylidene difluoride particles.

BACKGROUND ART OF THE INVENTION

Differently from polymer molded products such as films, fibers, injection molded products and extrusion molded products, polymer particles are used for modification and improvement of various materials by utilizing the large specific surface area and the structure of particles. The major use of these particles includes additives for toners, binder materials for paints and the like, additives for powder coating materials and the like, materials for coating metals, water repellent coating materials, and additives for molded articles such as automobile materials and construction materials.

Polyvinylidene difluoride particles have excellent properties such as weather resistance, stain resistance, solvent resistance, water resistance and moisture resistance, and are suitably used for applications such as a stain-resistant material in printers, a toner application, and a resin for weather-resistant or water-resistant paints.

There are some previously known methods to produce particles or powder of polyvinylidene difluoride, for example, a crushing method represented by freeze-crushing or the like, and a polymerization method in which the particles are obtained by emulsification polymerization or suspension polymerization (for example, see Patent Documents 1 to 9). However, the polymer particles or powder of polyvinylidene difluoride obtained by such a method have problems. For example, the obtained particles do not form a true spherical shape, their particle diameter cannot be controlled, and their particle diameter distribution becomes broad. Therefore, in several fields such as coating materials and paints where the uniformity and the surface smoothness of particles are important, the effect produced by addition of these particles is not satisfactory under the existing circumstances.

PRIOR ART DOCUMENTS

Patent Documents

Patent document 1: JP-A-2012-511074
Patent document 2: JP-A-2011-231273
Patent document 3: JP-A-2011-177614
Patent document 4: JP-A-2007-308811
Patent document 5: JP-A-2003-82295
Patent document 6: JP-A-9-165535
Patent document 7: JP-A-11-184164
Patent document 8: JP-A-2009-83437
Patent document 9: JP-A-7-90153

SUMMARY OF THE INVENTION

Problems to be Solved by the Invention

An object of the present invention is to provide a method for producing polyvinylidene difluoride particles, and to provide polyvinylidene difluoride particles suitable for the use such as paints or coatings.

Means for Solving the Problems

In order to solve the above-described object, the inventers of the present invention have reached the following inventions as a result of earnest investigation.

Namely, the polyvinylidene difluoride particles according to the present invention are polyvinylidene difluoride particles having any one of configurations described in the following (1) to (4).

(1) Polyvinylidene difluoride particles having an average particle diameter of 0.3 μm or more and less than 100 μm and a particle diameter distribution index of 1-2.
(2) The polyvinylidene difluoride particles according to (1), wherein a repose angle of the polyvinylidene difluoride particles is less than 40°.
(3) The polyvinylidene difluoride particles according to (1) or (2), wherein an average sphericity of the polyvinylidene difluoride particles is 80 or more.
(4) The polyvinylidene difluoride particles according to any one of (1) to (3), wherein the polyvinylidene difluoride particles are solid.

Further, the method for producing polyvinylidene difluoride particles according to the present invention is a method having any one of configurations described in the following (5) to (12).
(5) A method for producing polyvinylidene difluoride particles characterized in that, in a system which, when a polyvinylidene difluoride (A) and a polymer (B) different from the polyvinylidene difluoride (A) are dissolved and mixed in an organic solvent (C) comprising at least one type selected from the group consisting of ketone-based organic solvents, nitrile-based organic solvents and ether-based organic solvents, causes phase separation into two phases of a solution phase having the vinylidene difluoride (A) as its main component and a solution phase having the polymer (B) different from the polyvinylidene difluoride (A) as its main component, the method for producing polyvinylidene difluoride particles includes steps of an emulsion forming step of forming an emulsion of the polyvinylidene difluoride (A), the polymer (B) different from the polyvinylidene difluoride (A) and the organic solvent (C), and
a particle forming step of precipitating polyvinylidene difluoride particles by bringing a poor solvent for polyvinylidene difluoride having a smaller solubility of polyvinylidene difluoride than the organic solvent (C) into contact with the emulsion.
(6) The method for producing polyvinylidene difluoride particles according to (6), wherein each solvent of two separated phases is the same.
(7) The method for producing polyvinylidene difluoride particles according to (5) or (6), wherein the polymer (B) different from the polyvinylidene difluoride (A) is a thermoplastic resin.
(8) The method for producing polyvinylidene difluoride particles according to any one of (5) to (7), wherein the polymer (B) different from the polyvinylidene difluoride (A) dissolves in the poor solvent for polyvinylidene difluoride.
(9) The method for producing polyvinylidene difluoride particles according to any one of (5) to (8), wherein the polymer (B) different from the polyvinylidene difluoride (A) is a polyvinyl alcohol, a hydroxypropyl cellulose, a polyethylene oxide or a polyethylene glycol.

(10) The method for producing polyvinylidene difluoride particles according to any one of (5) to (9), wherein the poor solvent for polyvinylidene difluoride is water.
(11) The method for producing polyvinylidene difluoride particles according to any one of (5) to (10), wherein the organic solvent (C) is an ether-based organic solvent having a boiling point of 100° C. or more.
(12) The method for producing polyvinylidene difluoride particles according to (11), wherein the organic solvent (C) is diethylene glycol dimethyl ether.

Effect According to the Invention

The method of the present invention for producing polyvinylidene difluoride particles makes it possible to easily produce polyvinylidene difluoride particles, and further, to produce desired polyvinylidene difluoride particles appropriate to their use, for example, polyvinylidene difluoride particles which are formed into a true spherical shape and excellent in slidability, which can be dispersed homogeneously, and which can be processed without coating unevenness. The polyvinylidene difluoride particles obtained by the present invention can be suitably used for slush-moldable material, rapid prototyping/rapid manufacturing material, paste resin for plastic sol, a powder blocking agent, a powder flowability improving agent, lubricant, a rubber compounding ingredient, a polishing agent, a viscosity improver, filter material/a filter aid, a gelatinizer, a coagulating agent, an additive for paints, oil absorbing material, a mold releasing agent, a slipperiness improver for plastic films/sheets, an antiblocking agent, a gloss adjusting agent, a frosted finish agent, a light diffusion agent, a surface hardness improving agent, binder material, an adhesive, a coating agent, a valve/a cap in a manufacturing device for semiconductors or liquid crystal displays, a guide rail, a roller, a bolt, a lining, various modifying agents such as ductility improving material, a spacer for liquid crystal display equipments, a filler for chromatography, a support agent for perfume/pesticide, a catalyst/a catalyst-carrier for chemical reaction, a gas adsorption agent, sintered material for ceramic processing, standard particle material for measurement/analysis, particle material for food manufacturing industry, material for powder coating, and toner for electrophotographic development.

EMBODIMENTS FOR CARRYING OUT THE INVENTION

Hereinafter, the present invention will be explained in detail.
The method of the present invention for producing polyvinylidene difluoride is a method comprising the steps of, in a system which, when a polyvinylidene difluoride (A) and a polymer (B) different from the polyvinylidene difluoride (A) are dissolved and mixed in an organic solvent (C) comprising at least one type selected from the group consisting of ketone-based organic solvents, nitrile-based organic solvents and ether-based organic solvents, causes phase separation into two phases of a solution phase having the vinylidene difluoride (A) as its main component and a solution phase having the polymer (B) different from the polyvinylidene difluoride (A) as its main component, an emulsion forming step of forming an emulsion of the polyvinylidene difluoride (A), the polymer (B) different from the polyvinylidene difluoride (A) and the organic solvent (C), and a particle forming step of precipitating polyvinylidene difluoride particles by bringing a poor solvent for polyvinylidene difluoride having a smaller solubility of polyvinylidene difluoride than the organic solvent (C) into contact with the emulsion.

In the present invention, polyvinylidene difluoride refers to a polymer obtained by polymerization of vinylidene difluoride, and means a polymer represented by the following general formula (1).

[Chem. 1]

(1)

In the present invention, it is possible to use a commercially available product as polyvinylidene difluoride (A). Concrete examples of such a commercially available polyvinylidene difluoride are, for instance, KF polymer W #1100, #1300, #1700, #7200, #7300, #9100, #9200 and #9300 (supplied by Kureha Corporation), KYNAR 721, 741, 761, 461, 301F, HSV900, KYNAR FLEX 2851, 2801 and 2821 (supplied by Arkema K.K.), Solef 1013, 1015, 21216, 31508 and 6020 (supplied by Solvay Solexis Inc.), and reagents supplied by Sigma-Aldrich Japan K.K.

In the present invention, the polyvinylidene difluoride (A) may be a homopolymer of vinylidene difluoride, or may contain a copolymer copolymerized with the other monomer component containing no vinylidene difluoride, provided that the amount of the copolymer is within a range where the characteristics of polyvinylidene difluoride are not spoiled. As an example of the other monomer component containing no vinylidene difluoride, the copolymer may be a copolymer copolymerized with any of the following monomer components: a hydrocarbon-based vinyl monomer such as ethylene, propylene, isobutene and butadiene; a fluorine-based vinyl monomer such as ethylene fluoride, ethylene trifluoride and ethylene tetrafluoride; a monomer having a carboxyl ester group such as methyl acrylate, ethyl acrylate, butyl acrylate, methyl methacrylate, ethyl methacrylate, butyl methacrylate, methyl maleate, ethyl maleate, butyl maleate, 2-carboxyethyl acrylate, 2-carboxyethyl methacrylate, acryloyloxyethyl succinate, methacryloyloxyethyl succinate, acryloyloxyethyl phthalate, methacryloyloxyethyl phthalate and trifluoromethyl acrylate; a monomer having a carboxyl group such as acrylic acid, methacrylic acid, maleic acid and maleic acid monomethyl ester; and others such as vinyl acetate and its saponified ingredients, vinyl propionate and its saponified ingredients, and, vinyl butyrate and its saponified ingredients. When the total amount of constitution units of the polyvinylidene difluoride (A) is defined as 100 mol %, the amount of the copolymer is usually 30 mol % or less, preferably 25 mol % or less, more preferably 20 mol % or less, further preferably 10 mol % or less, and particularly preferably 5 mol % or less, although the amount is not particularly limited as long as it is within a range where the characteristics of polyvinylidene difluoride are not spoiled.

With regard to the polyvinylidene difluoride (A), the lower limit of its molecular weight is 1,000 or more, preferably 5,000 or more, more preferably 10,000 or more, further preferably 50,000 or more, particularly preferably 100,000 or more, and extremely preferably 500,000 or more, in terms of weight average molecular weight. Further, the lower limit of its molecular weight is 10,000,000 or less, preferably 5,000,000 or less, more preferably 2,000,000 or less, and further preferably 1,000,000 or less, in terms of weight average molecular weight.

Where, in the present invention, the molecular weight of the polyvinylidene difluoride (A) means a weight average molecular weight in terms of polystyrene that is measured by gel permeation chromatography (GPC) using dimethyl formamide as a solvent.

In the present invention, the polymer (B) different from polyvinylidene difluoride may be, for example, thermoplastic resin or thermosetting resin. From the viewpoint of solubility in the later-described organic solvent (C), thermoplastic resin is preferable.

More specifically, examples of thermoplastic resin include the following: synthetic resins such as poly(vinyl alcohol) (may be either a complete saponification type or a partial saponification type of poly(vinyl alcohol)), poly (vinyl alcohol-ethylene) copolymer (may be either a complete saponification type or a partial saponification type of poly(vinyl alcohol-ethylene) copolymer), polyvinylpyrrolidone, poly(ethylene glycol), poly(ethylene oxide), sucrose fatty acid ester, poly(oxyethylene fatty acid ester), poly (oxyethylene lauric fatty acid ester), poly(oxyethylene glycol mono-fatty acid ester), poly(oxyethylene alkyl phenyl ether), poly(oxyalkyl ether), polyacrylic acid, sodium polyacrylate, polymethacrylic acid, sodium polymethacrylate, polystyrene sulfonic acid, polystyrene sodium sulfonate, poly(vinyl pyrrolidinium chloride), poly(styrene-maleic acid) copolymer, aminopoly(acrylic amide), poly(para-vinyl phenol), polyallylamine, polyvinylether, polyvinylformal, poly(acrylamide), poly(methacrylamide), poly(oxyethylene amine), poly(vinyl pyrrolidone), poly(vinyl pyridine), polyaminosulfone and polyethyleneimine; disaccharides such as maltose, cellobiose, lactose and sucrose; cellulose derivatives such as cellulose, chitosan, hydroxyethyl cellulose, hydroxypropyl cellulose, methylcellulose, ethyl cellulose, ethyl hydroxy cellulose, carboxymethylethylcellulose, carboxymethylcellulose, sodium carboxymethylcellulose and cellulose ester; polysaccharides and their derivatives such as amylose and its derivatives, starch and its derivatives, dextrin, cyclodextrin, sodium alginate and its derivatives; and others such as gelatin, casein, collagen, albumin, fibroin, keratin, fibrin, carrageenan, chondroitin sulfate, arabian gum, agar and protein. Further, from the viewpoint of narrowing the particle diameter distribution, preferred thermoplastic resins are poly(vinyl alcohol) (may be either a complete saponification type or a partial saponification type of poly (vinyl alcohol)), poly(vinyl alcohol-ethylene) (may be either a complete saponification type or a partial saponification type of poly (vinyl alcohol-ethylene)), poly(ethyleneglycol), poly(ethyleneoxide), sucrose fatty acid ester, poly(oxyethylene alkyl phenyl ether), poly(oxyalkylether), polyacrylic acid, poly(methacrylic acid), cellulose derivatives such as carboxymethylcellulose, hydroxyethyl cellulose, hydroxypropyl cellulose, methyl cellulose, ethyl cellulose, ethyl hydroxy cellulose, carboxymethylethylcellulose, carboxymethylcellulose, sodium carboxymethylcellulose and cellulose ester, and polyvinylpyrrolidone. More preferred thermoplastic resins are poly(vinyl alcohol) (may be either a complete saponification type or a partial saponification type of poly (vinyl alcohol)), poly(vinyl alcohol-ethylene) (may be either a complete saponification type or a partial saponification type of poly (vinyl alcohol-ethylene)), poly(ethylene glycol), poly(ethylene oxide); cellulose derivatives such as carboxymethylcellulose, hydroxyethyl cellulose, hydroxypropyl cellulose, methyl cellulose, ethyl cellulose, ethyl hydroxy cellulose, carboxymethylethylcellulose, carboxymethylcellulose, sodium carboxymethylcellulose and cellulose ester, and polyvinylpyrrolidone. Particularly preferred thermoplastic resins are poly(vinyl alcohol) (may be either a complete saponification type or a partial saponification type of poly (vinyl alcohol)), poly(ethylene glycol), poly (ethylene oxide), and hydroxypropyl cellulose.

The molecular weight of the polymer (B) different from polyvinylidene difluoride is, in terms of weight average molecular weight, preferably in a range of 1,000 to 100,000,000, more preferably in a range of 1,000 to 10,000,000, further preferably in a range of 5,000 to 1,000,000, particularly preferably in a range of 10,000 to 500,000, and most preferably in a range of 10,000 to 100,000.

The weight average molecular weight referred to herein means a weight average molecular weight in terms of polyethylene glycol that is measured by gel permeation chromatography (GPC) using water as a solvent.

If water does not serve for the measurement, dimethylformamide will be used, and when dimethylformamide does not serve for the measurement, tetrahydrofuran will be used. Further, in the case where any of these solvents does not serve for the measurement, hexafluoroisopropanol will be used.

The organic solvent (C) comprising at least one type selected from the group consisting of ketone-based organic solvents, nitrile-based organic solvents and ether-based organic solvents (hereinafter, may also be referred to simply as "organic solvent (C)"), which is used in the present invention, is a pure or mixed solvent containing at least one type of ketone-based organic solvents, nitrile-based organic solvents and ether-based organic solvents. More specifically, examples of the ketone-based organic solvents include aliphatic ketones such as acetone, methyl ethyl ketone (2-butanone), 3-pentanone, 3-pentanone, methyl isopropyl ketone, diisopropyl ketone, methyl isobutyl ketone and diisobutyl ketone, and aromatic ketones such as acetophenone, phenyl ethyl ketone and diphenyl ketone; examples of the nitrile-based organic solvents include acetonitrile, propionitrile, butyronitrile, isobutyronitrile, valeronitrile, isovaleronitrile, trimethyl acetonitrile, hexanenitrile, heptanenitrile, malononitrile, succinonitrile, glutanonitrile, acrylonitrile and methacrylonitrile; and further, examples of the ether-based organic solvents include linear or branched chain aliphatic ethers such as dimethyl ether, diethyl ether, dipropyl ether, diisopropyl ether, dibutyl ether, dipentyl ether, dihexyl ether, dioctyl ether, diisoamyl ether, tert-amyl methyl ether, tert-butyl ethyl ether, butyl methyl ether, butyl ethyl ether, 1-methoxyethane (monoglyme), 1-ethoxyethane, diethylene glycol dimethyl ether (diglyme), ethylene glycol diethyl ether, 2-methoxy ethyl ether, di(ethylene glycol) diethyl ether, di(ethylene glycol) dibutyl ether and triethylene glycol dimethyl ether, cyclic aliphatic ethers such as tetrahydrofuran, 2-methyl tetrahydrofuran, 2,5-dimethyl tetrahydrofuran, 2,2,5,5-tetramethyl tetrahydrofuran, 2,3-dihydrofuran, 2,5-dihydrofuran, tetrahydropyran, 3-methyl tetrahydropyran and 1,4-dioxane, and aromatic ethers such as anisole, phenetole (ethyl phenol), diphenyl ether, 3-phenoxy toluene, p-tolyl ether, 1,3-diphenoxybenzene and 1,2-diphenoxyethane. Among them, from the viewpoint of industrial availability, preferred ketone-based organic solvents are acetone, methyl ethyl ketone, methyl isobutyl ketone, and diethyl ketone; preferred nitrile-based organic solvents are acetonitrile and propionitrile; and preferred ether-based organic solvents are dipropyl ether, diisopropyl ether, dibutyl ether, 1-ethoxyethane, diethylene glycol dimethyl ether (diglyme), ethylene glycol diethyl ether, 2-methoxy ethyl ether, di(ethylene glycol) diethyl ether, tetrahydrofuran, 2-methyl tetrahydrofuran, tetrahydropyran, 1,4-dioxane, and anisole. Further, more preferred ketone-based organic solvents are acetone and methyl ethyl ketone; more preferred nitrile-based organic solvent is acetonitrile; and more preferred ether-based organic solvents are dipropyl ether, diisopropyl ether, 1-ethoxyethane, and diethylene glycol dimethyl ether (diglyme).

Further, from the viewpoint of simplifying the later-described recycling step in which the organic solvent (C) is recycled by removing the poor solvent for vinylidene difluoride from the organic solvent (C) and the polymer (B) different from polyvinylidene difluoride that are separated during a solid-liquid separation step in a production process of the polyvinylidene difluoride particles of the present invention, the organic solvent (C) is preferably an ether-based organic solvent having a boiling point of 100° C. or higher, for example, diethylene glycol dimethyl ether (diglyme) or 1,4-dioxane. Such an organic solvent can be used either singly or in mixture, and from the viewpoint of simplifying the step of recycling the organic solvent, it is preferred to be used singly.

On the other hand, in order to obtain water dispersion liquid of sub-micrometer polyvinylidene difluoride particles that are useful for paints and the like, it is advantageous to remove the organic solvent after finishing the later-described particle producing step of the present invention, and for this purpose it is preferred to use an organic solvent having a boiling point lower than 100° C., which is the boiling point of water. As an example of such a solvent, representative ketone-based organic solvents include acetone, methyl ethyl ketone, and 3-methyl butanone; representative nitrile-based organic solvents include acetonitrile and propionitrile; and representative ether-based organic solvents include diethyl ether, dipropyl ether, diisopropyl ether, tetrahydrofuran, and tetrahydropyran.

The "system which causes phase separation into two phases of a solution phase having the polyvinylidene difluoride (A) as its main component and a solution phase having the polymer (B) different from the polyvinylidene difluoride (A) as its main component" means a system which is formed by dissolving the polyvinylidene difluoride (A) and the polymer (B) different from polyvinylidene difluoride in the organic solvent (C), and which causes phase separation into two phases of a solution phase mainly containing the polyvinylidene difluoride (A) (hereinafter, may also be referred to as polyvinylidene difluoride solution phase) and a solution phase mainly containing the polymer (B) different from polyvinylidene difluoride (hereinafter, may also be referred to as polymer B solution phase).

By mixing such a system under a phase-separation condition to cause emulsification, an emulsion is formed.

In the description above, whether the polymers can be dissolved or not is determined by examining whether the polyvinylidene difluoride (A) and the polymer (B) different from polyvinylidene difluoride can be dissolved in the organic solvent (C) by 1 mass % or more at a temperature at which the present invention is carried out, namely, a temperature at the time of dissolving the polyvinylidene difluoride (A) and the polymer (B) different from polyvinylidene difluoride into the organic solvent (C) in the present invention.

In the above-described emulsion, the polyvinylidene difluoride solution phase becomes a dispersed phase and the polymer B solution phase becomes a continuous phase. Bringing a poor solvent for polyvinylidene difluoride into contact with the emulsion makes it possible to precipitate polyvinylidene difluoride particles from the polyvinylidene difluoride solution phase in the emulsion, and to obtain particles consisting of the polyvinylidene difluoride (A) accordingly.

Where, the poor solvent for polyvinylidene difluoride means a solvent which has a smaller solubility of polyvinylidene difluoride (A) than the above-described organic solvent (C) and in which the polyvinylidene difluoride (A) can be hardly dissolved. More specifically, it means a solvent in which a solubility of the polyvinylidene difluoride (A) is 1 mass % or less. Where, the upper limit of the solubility of the polyvinylidene difluoride (A) in the poor solvent is more preferably 0.5 mass % or less, and further preferably 0.1 mass % or less.

The poor solvent for polyvinylidene difluoride used in the above-described production method is preferably a solvent which is a poor solvent for polyvinylidene difluoride and which can dissolve the polymer (B) different from polyvinylidene difluoride. Such a solvent makes it possible to efficiently precipitate polyvinylidene difluoride particles consisting of the polyvinylidene difluoride (A). Further, the poor solvent for polyvinylidene difluoride is preferably a solvent that can be mixed homogeneously with the organic solvent (C), which dissolves the polyvinylidene difluoride (A) and the polymer (B) different from polyvinylidene difluoride.

It is sufficient to choose the poor solvent for polyvinylidene difluoride on the basis of the type of the polyvinylidene difluoride (A) that is actually used, and desirably on the basis of the types of both the polyvinylidene difluoride (A) and the polymer (B) different from the polyvinylidene difluoride that are actually used. More specifically, examples of such a poor solvent include a solvent selected from at least one type of the following solvents: aliphatic hydrocarbon-based solvents such as pentane, hexane, heptane, octane, nonane, n-decane, n-dodecane, n-tridecane, cyclohexane, and cyclopentane; aromatic hydrocarbon-based solvents such as benzene, toluene, and xylene; alcohol-based solvents such as methanol, ethanol, 1-propanol, and 2-propanol; and water.

Where, from the viewpoint of efficiently precipitating the polyvinylidene difluoride (A) into particles, preferred poor solvents are aromatic hydrocarbon-based solvents, aliphatic hydrocarbon-based solvents, alcohol-based solvents and water; more preferred poor solvents are alcohol-based solvents and water; and the most preferred poor solvent is water.

As described above, by selecting an appropriate combination of the polyvinylidene difluoride (A), the polymer (B) different from polyvinylidene difluoride, the organic solvent (C) for dissolving them and the poor solvent for polyvinylidene difluoride, it is possible to efficiently precipitate polyvinylidene difluoride and obtain polymer particles.

The mixed liquid in which the polyvinylidene difluoride (A) and the polymer (B) different from polyvinylidene difluoride are dissolved in the organic solvent (C) must cause phase separation into two phases of a solution phase mainly containing the polyvinylidene difluoride (A) and a solution phase mainly containing the polymer (B) different from the polyvinylidene difluoride (A). In this step, the organic solvent (C) in the solution phase mainly containing the polyvinylidene difluoride (A) and the organic solvent (C) in the solution phase mainly containing the polymer (B) different from the polyvinylidene difluoride (A) may be identical with or different from each other, however, it is preferred that these solvents are the same solvent. Where, "the same solvent" referred to herein may include a situation where the types of these solvents are substantially the same.

The condition for forming the two separate phases varies depending upon the type of the polyvinylidene difluoride (A) or the polymer (B) different from polyvinylidene difluoride, the molecular weight of the polyvinylidene difluoride (A) or the polymer (B) different from polyvinylidene difluoride, the type of the organic solvent (C), the concentration of the polyvinylidene difluoride (A) or the polymer (B) different from polyvinylidene difluoride, and the temperature and pressure at which the invention is to be carried out.

In order to determine a condition where phase separation is likely to occur, it is preferred that there is a significant difference between the solubility parameters (hereinafter, may also be referred to as SP value) of the polyvinylidene difluoride (A) and the polymer (B) different from polyvinylidene difluoride.

Where, the difference between the SP values is preferably 1 $(J/cm^3)^{1/2}$ or more, more preferably 2 $(J/cm^3)^{1/2}$ or more, further preferably 3 $(J/cm^3)^{1/2}$ or more, particularly preferably 5 $(J/cm^3)^{1/2}$ or more, and most preferably 8 $(J/cm^3)^{1/2}$ or more. When the SP values satisfy this range, phase separation is likely to occur easily, and such a situation in which phase separation is likely to occur makes it possible to obtain polyvinylidene difluoride particles having a higher content of polyvinylidene difluoride ingredients. The upper limit of the difference between the SP values is preferably 20 $(J/cm^3)^{1/2}$ or less, more preferably 15 $(J/cm^3)^{1/2}$ or less, and further preferably 10 $(J/cm^3)^{1/2}$ or less, however, the difference is not particularly limited thereto as long as both the polyvinylidene difluoride (A) and the polymer (B) different from polyvinylidene difluoride can be dissolved in the organic solvent (C).

Where, the SP value referred to herein is a value calculated according to Fedor's estimation method, and more specifically, calculated on the basis of coagulation energy density and molar molecular volume ("SP value, base, application and calculation method", Hideki Yamamoto, published by Johokiko Co., Ltd., Mar. 31, 2005). If the value cannot be calculated using this method, the other SP value that is calculated on the basis of whether the target is dissolved in a known solvent or not will be used alternatively ("Polymer Handbook Fourth Edition", J. Brand, published by Wiley, 1998).

Appropriate condition for phase separation can be determined using a three-component phase diagram of the polyvinylidene difluoride (A), the polymer (B) different from polyvinylidene difluoride and the organic solvent (C) to dissolve them, and the three-component phase diagram can be made from a simple preliminary test to observe various states caused by changing the ratio of these components.

More specifically, the polyvinylidene difluoride (A), the polymer (B) different from polyvinylidene difluoride and the organic solvent (C) are mixed and dissolved at an arbitrary ratio, left at a stationary condition for a certain period, and thereafter observed to determine whether an interface is formed or not. This test is carried out at least at 3 or more ratios, preferably at 5 or more ratios, and more preferably at 10 or more ratios; and the phase diagram is prepared on the basis of the determination results of those. By using this phase diagram to distinguish the region where two phase separation takes place from the region where only one phase forms, it is possible to ascertain the condition to cause phase separation.

In order to determine whether a phase-separated state is formed or not, after adjusting the ratio of the polyvinylidene difluoride (A), the polymer (B) different from polyvinylidene difluoride and the organic solvent (C) at a certain ratio, the polyvinylidene difluoride (A) and the polymer (B) different from polyvinylidene difluoride are completely dissolved and sufficiently stirred in the organic solvent (C) at the temperature and pressure where the present invention is to be carried out. After leaving the obtained solution at a stationary condition for three days, it is examined whether phase separation occurs macroscopically. However, when a sufficiently stable emulsion is formed, macroscopic phase separation may not occur even after being left at a stationary condition for three days. In such a case, the occurrence of phase separation will be determined on the basis of whether microscopic phase separation occurs or not by using an optical microscope, a phase contrast microscope or the like.

The phase separation takes place as a result of separation between the polyvinylidene difluoride solution phase having the polyvinylidene difluoride (A) as its main component and the polymer B solution phase having the polymer (B) different from polyvinylidene difluoride as its main component in the organic solvent (C). Where, the polyvinylidene difluoride solution phase is a phase where mainly the polyvinylidene difluoride is distributed, and the polymer B solution phase is a phase where mainly the polymer (B) different from polyvinylidene difluoride is distributed. In this step, it seems reasonable to assume that the polyvinylidene difluoride solution phase and the polymer B solution phase have volume ratios depending upon the types and amounts of the polyvinylidene difluoride (A) and the polymer (B) different from polyvinylidene difluoride.

Each concentration of the polyvinylidene difluoride (A) and the polymer (B) different from polyvinylidene difluoride in the organic solvent (C) is not particularly limited as long as it is within a range where the polymer can be dissolved in the organic solvent (C). However, from the viewpoints of causing phase separation and considering industrial feasibility, the lower limit of each concentration is preferably more than 1 mass % with respect to the total mass, more preferably 2 mass %, further preferably 3 mass %, and particularly preferably 5 mass %. Further, the upper limit of each concentration is preferably 50 mass %, more preferably 30 mass %, and further preferably 20 mass %.

The interface tension between the two phases of the polyvinylidene difluoride solution phase and the polymer B solution phase becomes small because both phases are formed of an organic solvent, and this feature allows the resulting emulsion to be maintained stably, which seems to be a major factor causing a narrow diameter distribution.

The interface tension between the two phases is too small to measure directly with the commonly-used hanging-drop method in which a solution is added to another solution to take measurements. The interface tension, however, can be estimated from the surface tension of each phase exposed to air. Thus, assuming $r_1$ and $r_2$ represent the surface tension of each phase exposed to air, the interface tension between the two phases $r_{1/2}$ can be estimated by $r_{1/2}=|r_1-r_2|$ (the absolute value of $r_1-r_2$).

From the viewpoint of narrowing the particle diameter distribution, the upper limit of this $r_{1/2}$ is preferably 10 mN/m, more preferably 5 mN/m, further preferably 3 mN/m, and particularly preferably 2 mN/m. Further, the lower limit is more than 0 mN/m.

Further, the average particle diameter and the particle diameter distribution are affected by a viscosity ratio between the two phases, and a smaller viscosity ratio has a tendency to narrow the particle diameter distribution.

The lower limit of the viscosity ratio between the two phases is preferably 0.1 or more, more preferably 0.2 or more, further preferably 0.3 or more, still more preferably 0.5 or more, and notably preferably 0.8 or more. Further, the upper limit thereof is preferably 10 or less, more preferably 5 or less, further preferably 3 or less, particularly preferably 1.5 or less, and notably preferably 1.2 or less. Where, the viscosity ratio between the two phases referred to herein is defined as "the viscosity of the polyvinylidene difluoride solution phase/the viscosity of the polymer B phase" at a temperature at which the present invention is to be carried out.

In the present invention, polyvinylidene difluoride is formed into a particle shape to produce polymer particles by carrying out steps of an emulsion forming step in which the above-obtained phase separation system is mixed (namely, a shear force is applied to a solution consisting of the phase separation system) to form an emulsion and a particle forming step in which a poor solvent for polyvinylidene difluoride is brought into contact with the emulsion to precipitate polyvinylidene difluoride particles. Where, the emulsion forming step may be carried out after a step of dissolving the polyvinylidene difluoride (A) and the polymer (B) different from polyvinylidene difluoride in the organic solvent (C), or may be carried out concurrently with the step of dissolving the polyvinylidene difluoride (A) and the polymer (B) different from polyvinylidene difluoride in the organic solvent (C).

The above-described emulsion forming step and the above-described particle forming step can be carried out in a usual reaction vessel. From the viewpoint of industrial feasibility, the lower limit of the temperature at which the emulsion forming step and the particle forming step are to be carried out is usually 0° C. or higher, preferably 10° C. or higher, and further preferably 20° C. or higher, although the temperature is not particularly limited thereto as long as the temperature is in a range where it is possible to dissolve the polyvinylidene difluoride (A) and the polymer (B) different from polyvinylidene difluoride, to cause phase separation and to obtain desired particles. Further, its upper limit is preferably 300° C. or lower, more preferably 200° C. or lower, further preferably 160° C. or lower, particularly preferably 140° C. or lower, and notably preferably 100° C. or lower.

From the viewpoint of industrial feasibility, the pressure at which the present invention is to be carried out is in a range from the standard pressure to 10 atm. Its lower limit is preferably 1 atm or higher. Its upper limit is preferably 5 atm or lower, more preferably 3 atm or lower, and further preferably 2 atm or lower.

Further, it is preferred to use an inert gas in the reaction vessel. More specifically, examples of inert gas include nitrogen, helium, argon and carbon dioxide, and nitrogen and argon are preferred.

An emulsion is formed by mixing the above-described phase separation system under such a condition. In other words, an emulsion is formed by applying a shear force to the above-obtained solution as a phase separation system.

In the step of formation of emulsion, an emulsion is formed in such a manner that the polyvinylidene difluoride solution phase is formed into a shape of particle-like droplet. In phase separation, generally, such an emulsion is likely to be formed under a situation where the volume of the polymer B solution phase is larger than the volume of the polyvinylidene difluoride solution phase. More specifically, when the total volume of both phases is defined as 1, the volume ratio of the polyvinylidene difluoride solution phase is preferably less than 0.5, and more preferably in a range of 0.4 to 0.1.

An appropriate range of the volume ratio can be determined, for example, by measuring the volume ratio and concentration of each component concurrently at the time of preparing the above-described phase diagram.

The particles produced by the production method of the present invention become particles having a narrow particle diameter distribution as a result of high homogeneity of the emulsion obtained in the emulsion forming step. This tendency becomes remarkable when using a single solvent which can dissolve both the polyvinylidene difluoride (A) and the polymer (B) different from polyvinylidene difluoride.

In order to obtain a sufficient shear force for the formation of an emulsion in the emulsion forming step, a generally known stirring method can serve sufficiently, and the mixing can be carried out using a known method such as liquid phase stirring using stirring blades, stirring in a continuous twin mixer, mixing in a homogenizer, ultrasonic irradiation, etc.

More specifically, when using stirring blades to stir, the stirring speed is preferably 50 rpm to 1,200 rpm, more preferably 100 rpm to 1,000 rpm, further preferably 200 rpm to 800 rpm, and particularly preferably 300 to 600 rpm, although it may vary with the shape of the stirring blades.

More specifically, representative types of stirring blades include propeller, paddle, flat paddle, turbine, double cone, single cone, single ribbon, double ribbon, screw, and helical ribbon, although the types are not particularly limited thereto as long as a shear force can be sufficiently applied to the system. Further, in order to stir the system efficiently, baffle plates or the like may be provided in the vessel.

Further, in order to produce an emulsion, a well-known device such as an emulsifying machine or a dispersion machine may be used instead of a stirring machine. Examples of such a device include batch-type emulsifying machines such as Homogenizer (supplied by IKA), Polytron (supplied by Kinematica, Inc.), and T. K. Autohomomixer (supplied by Tokushu Kika Kogyo Co., Ltd.), and others such as Ebara Milder (supplied by Ebara Corporation), T. K. Filmics, T. K. Pipeline Homomixer (supplied by Tokushu Kika Kogyo Co., Ltd.), Colloid Mill (supplied by Shinko-Pantec Co., Ltd.), and Slusher, Trigonal Wet Grinder (supplied by Mitsui Miike Kakoki Co., Ltd.), as well as ultrasonic homogenizers and static mixers.

The emulsion thus obtained is subsequently subjected to the particle forming step of precipitating microparticles.

In order to obtain particles of the polyvinylidene difluoride (A), a poor solvent for polyvinylidene difluoride (hereinafter, may also be referred to simply as poor solvent) is brought into contact with the emulsion produced in the above-described emulsion forming step to precipitate particles having a diameter in correspondence with a diameter of the emulsion.

The method to bring the poor solvent and the emulsion into contact with each other may be either a method of pouring the emulsion in the poor solvent or a method of pouring the poor solvent in the emulsion, and the method of pouring the poor solvent in the emulsion is preferable.

The method of pouring the poor solvent is not particularly limited as long as desired polymer particles can be obtained, and the method may be any one of continuous dropping method, split dropping method and batch addition method. However, in order to prevent the emulsion from coagulating, fusing or coalescing at the time of addition of the poor solvent and consequently avoid producing particles having a broad particle diameter distribution or bulky grains larger than 1,000 µm, continuous dropping method and split dropping method are preferable. Further, in order to carry out this step in an industrially efficient manner, the most preferred method is continuous dropping method.

The temperature at which the poor solvent is brought into contact with the emulsion is not particularly limited as long as it is in a range where polyvinylidene difluoride particles can be precipitated; more specifically, it is in a range where the lower limit is 0° C. or higher and the upper limit is 300° C. or lower. The lower limit is preferably 10° C. or higher, and more preferably 20° C. or higher, because the poor solvent may solidify and become unusable if the temperature is too low. Further, the upper limit is preferably 200° C. or lower, more preferably 100° C. or lower, and further preferably 90° C. or lower, because the polyvinylidene difluoride (A) and the polymer (B) different from polyvinylidene difluoride may be prone to thermal degradation if the temperature is too high.

Further, the time of addition of the poor solvent is preferably in a range from 10 minutes or more to less than 50 hours, more preferably in a range from 15 minutes or more to less than 10 hours, and further preferably in a range from 30 minutes or more to less than 5 hours.

If the time is shorter than this range, there is a fear that the particle diameter distribution may become broad or some bulky grains may be formed as a result of coagulation, fusion or coalescence of the emulsion. Further, from the viewpoint of industrial feasibility, taking time longer than this range is impractical.

Carrying out the step of addition within such a time range makes it possible to prevent particles from coagulating during transformation from emulsion into polymer particles, and to produce polymer particles having a narrow particle diameter distribution accordingly.

When the total mass of the emulsion is defined as 1 part by mass, the amount of addition of the poor solvent is preferably in a range from 0.1 parts by mass to 10 parts by mass, more preferably from 0.1 parts by mass to 5 parts by mass, further preferably 0.2 parts by mass to 3 parts by mass, particularly preferably 0.2 parts by mass to 2 parts by mass, and most preferably 0.2 parts by mass to 1.0 part by mass, although it may vary according to a state of the emulsion.

In order to cause sufficient precipitation and achieve efficient productivity, the contact time between the poor solvent and the emulsion is preferably in a range of 5 minutes to 50 hours after completion of addition of the poor solvent, more preferably in a range from 5 minutes or more to less than 10 hours, further preferably in a range from 10 minutes or more to less than 5 hours, particularly preferably in a range from 20 minutes or more to less than 4 hours, and most preferably in a range from 30 minutes or more to less than 3 hours, although it is not particularly limited thereto as long as it is long enough to precipitate particles.

Powder of the particles can be collected by subjecting the dispersion liquid of the thus-obtained polymer particles to solid-liquid separation using a generally known method such as filtration, reduced pressure filtration, compression filtration, centrifugal separation, centrifugal filtration, spray drying, etc.

The polymer particles obtained from the solid-liquid separation may be refined, if necessary, by washing them with a solvent or the like to remove impurities that are carried on their surfaces or contained in them.

In the production method described above, it is possible to recycle the organic solvent (C) and the polymer (B) different from polyvinylidene difluoride that are separated in the solid-liquid separation step carried out in the process of obtaining the particle powder.

The solvent obtained from the solid-liquid separation is a mixture of the polymer (B) different from polyvinylidene difluoride, the organic solvent and the poor solvent. Removing the poor solvent from this solvent makes it possible to recycle the remaining liquid as a solvent for forming the emulsion. The removal of the poor solvent can be carried out using a generally known method. More specifically, examples of such a method include simple distillation, reduced pressure distillation, precision distillation, thin film distillation, extraction, membrane separation, etc.; and preferred methods include simple distillation, reduced pressure distillation and precision distillation.

When carrying out a distillation operation such as simple distillation or reduced pressure distillation, a heat that is applied to the system may promote thermal decomposition of the polymer (B) different from polyvinylidene difluoride and the organic solvent (C). Therefore, it is preferred to carry out the operation in an oxygen-free state, and more preferably in an inert atmosphere, just as in the case of the above-described production process of polymer particles. More specifically, the operation is preferably carried out under a condition of nitrogen, helium, argon, or carbon dioxide. Further, a phenolic compound may be again added as an antioxidant.

When carrying out the above-described recycling step, it is preferred to remove the poor solvent as much as possible. More specifically, in terms of a percentage with respect to the total amount of the organic solvent (C) and the polymer (B) different from polyvinylidene difluoride that are to be recycled, the remaining amount of the poor solvent is 10 mass % or less, preferably 5 mass % or less, more preferably 3 mass % or less, and particularly preferably 1 mass % or less. If the remaining amount exceeds this range, there is a fear that the particle diameter distribution may become broader or the particles may be coagulated.

The amount of the poor solvent contained in the recycled solvent can be measured by a generally known method, such as gas chromatography or the Karl Fischer's method.

In the operation to remove the poor solvent, since there may be a loss of the organic solvent (C) or the polymer (B) different from polyvinylidene difluoride in practice, it is preferred to adjust their composition ratio to the initial ratio as deemed appropriate.

Hereinafter, the polyvinylidene difluoride particles of the present invention will be explained in detail.

With regard to the number average particle diameter of the polyvinylidene difluoride particles, it is possible to determine an appropriate range of particle diameter according to the use of the particles. For example, when used for paints or the like, particles having a smaller diameter exhibit greater smoothness, therefore the upper limit of the number average particle diameter is usually less than 100 µm, 80 µm or less in a preferred embodiment, 50 µm or less in a more preferred embodiment, 30 µm or less in a further preferred embodiment, and 20 µm or less in the most preferred embodiment. On the other hand, when used for lubricants or the like, particles having too small particle diameter are liable to coagulate, therefore the lower limit is usually 0.3 µm or more, preferably 0.5 µm or more, more preferably 0.7 µm or more, further preferably 0.8 µm or more, particularly preferably 1 µm or more, notably preferably more than 1 µm, exceptionally preferably 2 µm or more, extremely preferably 3 µm or more, and most preferably 5 µm or more.

Particle diameter distribution index is a property which characterizes distribution of particle diameters of polyvinylidene difluoride particles in the present invention. When the particle diameter distribution index is 2 or less, in the case of using the particles for paints or the like, the flowability of particles is improved, the particles become more uniform, and smoothness is imparted to the particles. The particle diameter distribution index is preferably 1.8 or less, more preferably 1.7 or less, further preferably 1.5 or less, particularly preferably 1.3 or less, and 1.2 or less in the most preferably embodiment. Further, the lower limit is theoretically 1.

Where, the number average particle diameter of the polyvinylidene difluoride referred to herein can be determined by measuring diameters of 100 particles selected randomly from a scanning electron microscope photograph and calculating the arithmetic average thereof. If there is a particle of a shape that is not a perfect circle but an ellipse or the like in the photograph, the maximum diameter of the particle is taken as its particle diameter. In order to measure the particle diameter precisely, the measurement is carried out at least at a magnification of 1,000 times or more, and preferably 5,000 times or more.

Further, the particle diameter distribution index is calculated using the thus-obtained particle diameters on the basis of the following conversion equations.

[Math. 1]
$$Dn = \sum_{i=1}^{n} Ri/n$$

$$Dv = \sum_{i=1}^{n} Ri^4 / \sum_{i=1}^{n} Ri^3$$

$$PDI = Dv/Dn$$

Where, Ri represents the particle diameter of each particle, n represents the number of measurements (=100), Dn represents the number average particle diameter, Dv represents the volume average particle diameter, and PDI represents the particle diameter distribution index.

Further, the polyvinylidene difluoride particles of the present invention is particles having a repose angle of less than 40°. The upper limit of the repose angle is usually less than 40°, preferably 39° or less, more preferably 38°, and further preferably 37° or less.

Furthermore, the lower limit of the repose angle is usually 25° or more, preferably 26° or more, more preferably 27° or more, and particularly preferably 28° or more. In the case where the repose angle is less than 25° or more than 40°, the powder flowability declines.

Where, in the present invention, the repose angle means a repose angle which is measured in accordance with the measurement method described in "JIS R 9301-2-2 Alumina powder—Chapter 2: Method for measuring physical property—2: Repose angle".

The average sphericity of the polyvinylidene difluoride particles is preferably 80 or more, more preferably 85 or more, further preferably 90 or more, particularly preferably 92 or more, and most preferably 95 or more. Additionally, its upper limit is 100. Controlling the average sphericity within the above-described range makes it possible to achieve an improvement in quality such as slidability. Where, the average sphericity is obtained by observing particles with a scanning electron microscope, measuring both the longest diameters and the shortest diameters of 30 particles selected randomly, calculating the sphericity of each particle according to the following equation (2b), and thereafter substituting the obtained sphericity of each particle into the following equation (2a).

[Math. 2]
$$S = \sum_{i=1}^{n} S_i / n \qquad (2a)$$

$$S_i = (D_S / D_L) \times 100 \qquad (2b)$$

Where, S represents the average sphericity, Si represents the sphericity of each particle, n represents the number of measurements (=30), $D_S$ represents the shortest diameter of a particle, and $D_L$ represents the longest diameter of a particle.

In the present invention, the polyvinylidene difluoride particles may be solid or hollow. However, from the viewpoint of industrial use, it is preferred to be solid.

Further, in order to confirm that the polyvinylidene difluoride particles of the present invention are solid, a transmission electron microscope can be used to observe the cross-section of the particles.

The polyvinylidene difluoride particles in the present invention are characterized by having a smooth surface, a true spherical shape and a narrow particle diameter distribution. Using such polyvinylidene difluoride particles as powder makes it possible to produce advantageous effects, for example, improvement in flowability, improvement in quality such as slipperiness, and ease of viscosity control when added to paints or the like. Further, since such polyvinylidene difluoride particles can easily flow on a surface of base material and uniformly fuse with the base material as a result of their narrow particle diameter distribution, they are particularly suitably used in the fields, such as toner, where high flowability and low-temperature fusing property are required.

Thus, the polyvinylidene difluoride particles of the present invention having a true spherical shape, a smooth surface and a narrow particle diameter distribution can be used as extremely useful and practical products in various industrial uses. More specifically, they can be used for additive for toners, rheology modifier for paints or the like, medical diagnostic/medical examination agent, mechanical property improver for molded products made of automobile materials/construction materials or the like, raw material for resin molded articles used in rapid prototyping/rapid manufacturing or the like, slush moldable material, paste resin for plastic sol, powder blocking agent, powder flowability improving agent, lubricant, rubber compounding ingredient, polishing agent, viscosity improver, filter material/filter aid, gelatinizer, coagulating agent, additive for paints, oil absorbing material, mold releasing agent, slipperiness improver for plastic films/sheets, antiblocking agent, gloss adjusting agent, frosted finish agent, light diffusion agent, surface hardness improving agent, various modifying agents such as ductility improving material, spacer for liquid crystal display equipment, filler for chromatography, base material/additive for cosmetic foundations, assistant for micro-capsules, medical materials for drug delivery system/diagnostic agents, support agent for perfume/pesticide, catalyst/catalyst-carrier for chemical reaction, gas adsorption agent, sintered material for ceramic processing, standard particle material for measurement/analysis, particle material for food manufacturing industry, material for powder coating, and toner for electrophotographic development.

EXAMPLES

Hereinafter, the present invention will be explained in detail on the basis of Examples, but it is not particularly limited thereto.

(1) Method for measuring average particle diameter and particle diameter distribution The particle diameter of each particle was measured by observing each particle using a scanning electron microscope (JSM-6301NF, a scanning electron microscope supplied by JEOL Ltd.) at a magnification of 1,000 times. In the case where a particle was not a perfect circle, the maximum diameter of the particle was taken as its particle diameter.

The average particle diameter was determined by measuring the particle diameters of 100 particles selected randomly from a scanning electron microscope photograph and calculating their arithmetic average.

The particle diameter distribution index, which is a property characterizing distribution of particle diameters, was calculated on the basis of the following conversion equation using the above-obtained particle diameter of each particle.

[Math. 3]
$$Dn = \sum_{i=1}^{n} Ri/n$$

$$Dv = \sum_{i=1}^{n} Ri^4 \bigg/ \sum_{i=1}^{n} Ri^3$$

$$PDI = Dv/Dn$$

Where, Ri represents the particle diameter of each particle, n represents the number of measurements (=100), Dn represents the number average particle diameter, Dv represents the volume average particle diameter, and PDI represents the particle diameter distribution index.

(2) Measurement of Repose Angle

The repose angle of polyvinylidene difluoride particles was determined by a measurement taken on particles having been dried in vacuum for 16 hours or more at 80° C. in accordance with "JIS R 9301-2-2 Alumina powder—Chapter 2: method for measuring physical property—2: Repose angle".

(3) Measurement of Average Sphericity

The average sphericity was obtained by observing particles with a scanning electron microscope, measuring both the longest diameters and the shortest diameters of 30 particles selected randomly, calculating the sphericity of each particle according to the following equation (4b), and thereafter substituting the obtained sphericity of each particle into the following equation (4a).

[Math. 4]
$$S = \sum_{i=1}^{n} S_i/n \qquad (4a)$$

$$S_i = (D_S/D_L) \times 100 \qquad (4b)$$

Where, S represents the average sphericity, Si represents the sphericity of each particle, n represents the number of measurements (=30), $D_S$ represents the shortest diameter of a particle, and $D_L$ represents the longest diameter of a particle.

(4) Cross-Sectional Observation of Particles

In order to confirm whether particles were solid, the particles were embedded in an epoxy resin for electron microscopy, the resin was sliced to obtain a very thin observation sample as a sample for transmission electron microscopy, and the sample was observed using a transmission electron microscope (H-7100, supplied by Hitachi, Ltd.).

(5) Measurement of Molecular Weight of Polyvinylidene Difluoride

The weight average molecular weight of polyvinylidene difluoride particles was calculated by using gel permeation chromatography with reference to the calibration curve of polystyrene.

Device: LC-10A series, supplied by Shimazu Corporation
Columns: two KD-806Ms, supplied by Showa Denko K.K.
Mobile phase: dimethyl formamide
Flow rate: 1.0 ml/min
Detector: refractive index detector
Column temperature: 40° C.

(6) Measurement of Molecular Weight of Polymer B

The weight average molecular weight of polymer B was calculated by using gel permeation chromatography with reference to the calibration curve of polyethylene glycol.

Device: LC-10A series, supplied by Shimazu Corporation
Columns: two GF-7MHQs, supplied by Showa Denko K.K.
Mobile phase: 10 mmol/L lithium bromide aqueous solution
Flow rate: 1.0 ml/min
Detector: refractive index detector
Column temperature: 40° C.

Example 1

17.5 g of polyvinylidene difluoride (supplied by Sigma-Aldrich Japan K.K., a reagent, CAS No.: 24937-79-9, weight average molecular weight: 354,000, SP value: 15.4 $(J/cm^3)^{1/2}$), 17.5 g of hydroxypropyl cellulose (supplied by Tokyo Chemical Industry Co., Ltd., weight average molecular weight: 118,000, SP value: 29.0 $(J/cm^3)^{1/2}$) as a polymer different from polyvinylidene difluoride, and 315 g of diethylene glycol dimethyl ether (diglyme) as an ether-based organic solvent were added into a 1,000 ml pressure resistant glass autoclave (supplied by Taiatsu Techno Corporation, HIPER GLASTOR TEM-V1000N), heated up to 140° C. after replacing the atmosphere in the autoclave with nitrogen by 99 volume % or more, and stirred for 2 hours using helical ribbon type stirring blades until the polymers were dissolved. Thereafter, 350 g of ion exchanged water as a poor solvent was dropped at a speed of 2.92 g/min. through a feeding pump. After the whole amount of water was poured, the temperature was lowered down to room temperature while keeping stirring so as to form a suspension.

The obtained suspension was filtered and washed using 700 g of ion exchanged water, and the filtered substances were vacuum dried at 80° C. for 10 hours to obtain 15 g of white solid powder material.

Figure 1:
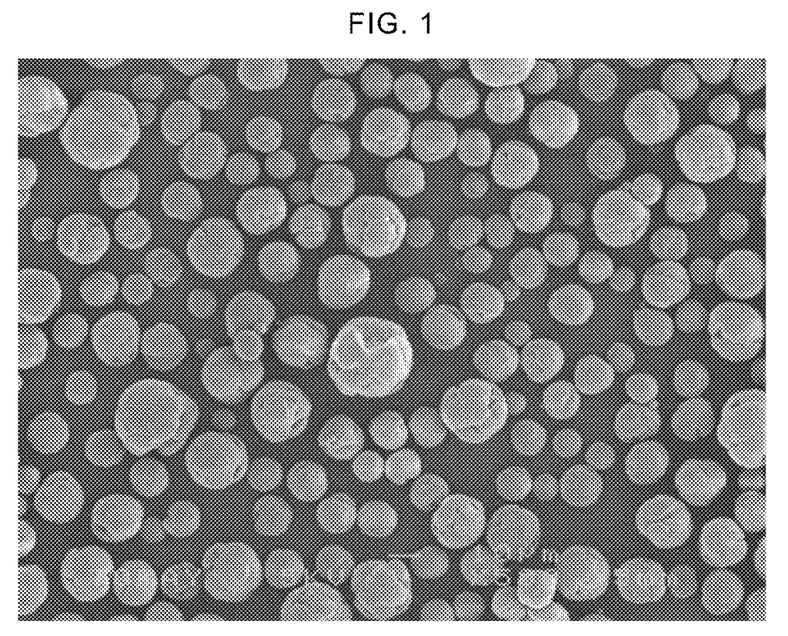
FIG. 1 is an observation diagram obtained by a scanning electron microscope, showing polyvinylidene difluoride particles produced in Example 1.

According to an observation of the obtained powder with a scanning electron microscope, they were polyvinylidene difluoride particles having a true spherical particle shape, an average sphericity of 92, a number average particle diameter of 13.4 μm, and a particle diameter distribution index of 1.29. Further, the repose angle of them was 31°, and they were solid according to a cross-sectional observation with a transmission electron microscope. FIG. 1 depicts an observation diagram of these polyvinylidene difluoride particles with a scanning electron microscope.

The polyvinylidene difluoride particles obtained in this Example had a high average sphericity and were thus smooth and excellent in powder flowability.

Example 2

17.5 g of polyvinylidene difluoride (supplied by Sigma-Aldrich Japan K.K., a reagent, CAS No.: 24937-79-9, weight average molecular weight: 354,000, SP value: 15.4 $(J/cm^3)^{1/2}$), 17.5 g of hydroxypropyl cellulose (supplied by Tokyo Chemical Industry Co., Ltd., weight average molecular weight: 118,000, SP value: 29.0 $(J/cm^3)^{1/2}$) as a polymer different from polyvinylidene difluoride, and 315 g of diethylene glycol dimethyl ether (diglyme) as an ether-based organic solvent were added into a 1,000 ml pressure resistant glass autoclave (supplied by Taiatsu Techno Corporation, HIPER GLASTOR TEM-V1000N), heated up to 160° C. after replacing the atmosphere in the autoclave with nitrogen by 99 volume % or more, and stirred for 2 hours using helical ribbon type stirring blades until the polymers were dissolved. Thereafter, 350 g of ion exchanged water as a poor solvent was dropped at a speed of 2.92 g/min. through a feeding pump. After the whole amount of water was poured, the temperature was lowered down to room temperature while keeping stirring so as to form a suspension. The obtained suspension was filtered and washed using 700 g of ion exchanged water, and the filtered substances were vacuum dried at 80° C. for 10 hours to obtain 15 g of white solid powder material.

Figure 2:
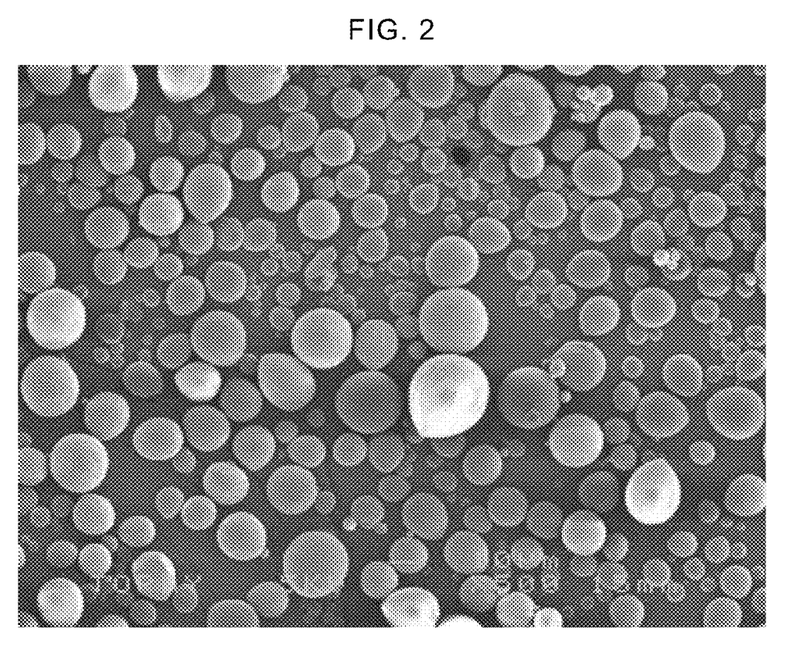
FIG. 2 is an observation diagram obtained by a scanning electron microscope, showing polyvinylidene difluoride particles produced in Example 2.

According to an observation of the obtained powder with a scanning electron microscope, they were polyvinylidene difluoride particles having a true spherical particle shape, an average sphericity of 87, a number average particle diameter of 8.9 μm, and a particle diameter distribution index of 1.68. Further, the repose angle of them was 34°, and they were solid according to a cross-sectional observation with a transmission electron microscope. FIG. 2 depicts an observation diagram of these polyvinylidene difluoride particles with a scanning electron microscope. The polyvinylidene difluoride particles obtained in this Example had a high average sphericity and were thus smooth and excellent in powder flowability.

Example 3

1.5 g of polyvinylidene difluoride (supplied by Kureha Corporation, #9300, weight average molecular weight: 2,161,000, SP value: 15.4 $(J/cm^3)^{1/2}$), 7.5 g of hydroxypropyl cellulose (a product having a viscosity of 6-15 mPa·s when used as a 2% aqueous solution), and 41 g of acetone were added into a 200 ml separable flask provided with helical ribbon type stirring blades and a cooling tube, and stirred at a speed of 450 rpm at 50° C. The solution became cloudy and whitish, indicating that emulsion was formed therein. Subsequently, 100 g of water was added thereto at a speed of 0.41 g/min, and after the whole amount of water was poured, the temperature was lowered down to room temperature while keeping stirring so as to form a suspension. The obtained suspension was filtered and washed using 100 g of ion exchanged water, and the filtered substances were vacuum dried at 80° C. for 10 hours to obtain 1.45 g of white solid powder material.

According to an observation of the obtained powder with a scanning electron microscope, they were polyvinylidene difluoride particles having a true spherical particle shape, an average sphericity of 89, a number average particle diameter of 6.1 μm, and a particle diameter distribution index of 1.75. Further, the repose angle of them was 32°, and they were solid according to a cross-sectional observation with a transmission electron microscope. The polyvinylidene difluoride particles obtained in this Example had a high average sphericity and were thus smooth and excellent in powder flowability.

Example 4

1.5 g of polyvinylidene difluoride (supplied by Kureha Corporation, #9300, weight average molecular weight: 2,161,000, SP value: 15.4 $(J/cm^3)^{1/2}$), 3.5 g of hydroxypropyl cellulose (a product having a viscosity of 6-15 mPa·s when used as a 2% aqueous solution), and 45 g of acetonitrile were added into a 200 ml separable flask provided with helical ribbon type stirring blades and a cooling tube, and stirred at a speed of 450 rpm at 50° C. The solution became cloudy and whitish, indicating that emulsion was formed therein. Subsequently, 50 g of water was added thereto at a speed of 0.41 g/min, and after the whole amount of water was poured, the temperature was lowered down to room temperature while keeping stirring so as to form a suspension. The obtained suspension was filtered and washed using 100 g of ion exchanged water, and the filtered substances were vacuum dried at 80° C. for 10 hours to obtain 1.47 g of white solid powder material.

According to an observation of the obtained powder with a scanning electron microscope, they were polyvinylidene difluoride particles having a true spherical particle shape, an average sphericity of 90, a number average particle diameter of 6.3 μm, and a particle diameter distribution index of 1.27. Further, the repose angle of them was 33°, and they were solid according to a cross-sectional observation with a transmission electron microscope. The polyvinylidene difluoride particles obtained in this Example had a high average sphericity and were thus smooth and excellent in powder flowability.

Example 5

1.5 g of polyvinylidene difluoride (supplied by Kureha Corporation, #9300, weight average molecular weight: 2,161,000, SP value: 15.4 $(J/cm^3)^{1/2}$), 5 g of hydroxypropyl cellulose (a product having a viscosity of 6-15 mPa·s when used as a 2% aqueous solution), and 43.5 g of acetonitrile were added into a 200 ml separable flask provided with helical ribbon type stirring blades and a cooling tube, and stirred at a speed of 450 rpm at 50° C. The solution became cloudy and whitish, indicating that emulsion was formed therein. Subsequently, 50 g of water was added thereto at a speed of 0.41 g/min, and after the whole amount of water was poured, the temperature was lowered down to room temperature while keeping stirring so as to form a suspension. The obtained suspension was filtered and washed using 100 g of ion exchanged water, and the filtered substances were vacuum dried at 80° C. for 10 hours to obtain 1.44 g of white solid powder material.

According to an observation of the obtained powder with a scanning electron microscope, they were polyvinylidene difluoride particles having a true spherical particle shape, an average sphericity of 90, a number average particle diameter of 7.0 μm, and a particle diameter distribution index of 1.21. Further, the repose angle of them was 30°, and they were solid according to a cross-sectional observation with a transmission electron microscope. The polyvinylidene difluoride particles obtained in this Example had a high average sphericity and were thus smooth and excellent in powder flowability.

Example 6

10.5 g of polyvinylidene difluoride (supplied by Kureha Corporation, #9300, weight average molecular weight: 2,161,000, SP value: 15.4 $(J/cm^3)^{1/2}$), 52.5 g of polyethylene oxide (supplied by Meisei Chemical Works, Ltd., ALKOX R-1000, weight average molecular weight:259,000), and 287 g of acetonitrile were added into a 1,000 ml pressure resistant glass container provided with helical ribbon type stirring blades, and stirred at a speed of 350 rpm at 140° C. The solution became cloudy and whitish, indicating that emulsion was formed therein. Subsequently, 350 g of water was added thereto at a speed of 2.92 g/min, and after the whole amount of water was poured, the temperature was lowered down to room temperature while keeping stirring so as to form a suspension. The obtained suspension was filtered and washed using 300 g of ion exchanged water, and the filtered substances were vacuum dried at 80° C. for 10 hours to obtain 9.7 g of white solid powder material.

According to an observation of the obtained powder with a scanning electron microscope, they were polyvinylidene difluoride particles having a true spherical particle shape, an average sphericity of 91, a number average particle diameter of 1.8 μm, and a particle diameter distribution index of 1.32. Further, the repose angle of them was 36°, and they were solid according to a cross-sectional observation with a transmission electron microscope. The polyvinylidene difluoride particles obtained in this Example had a high average sphericity and were thus smooth and excellent in powder flowability.

Comparative Example 1

15 g of polyvinylidene difluoride (supplied by Sigma-Aldrich Japan K.K., a reagent, CAS No.: 24937-79-9, weight average molecular weight: 354,000, SP value: 15.4 $(J/cm^3)^{1/2}$) was frozen and crushed to obtain powder of polyvinylidene difluoride by using Freezer/Mill 6750 supplied by SPEX SamplePrep, LLC under conditions where a crushing operation was carried out 3 times in liquid nitrogen at an impact speed of 20 times/sec, taking 2 minutes for each operation.

According to an observation of the obtained powder with a scanning electron microscope, they were powder having unevenness in shape, an average sphericity of 53, a number average particle diameter of 128 μm, and a particle diameter distribution index of 2.15. Further, the repose angle of them was 45°, the obtained powder had no regular shape, and were very coarse and inferior in powder flowability, although they were solid according to a cross-sectional observation with a transmission electron microscope.

The invention claimed is:

1. A method for producing polyvinylidene difluoride particles, said method for producing polyvinylidene difluoride particles comprising:
    an emulsion forming step of forming an emulsion of a polyvinylidene difluoride (A), a polymer (B) different from said polyvinylidene difluoride (A), and an organic solvent (C), and
    a particle forming step of precipitating polyvinylidene difluoride particles by bringing a poor solvent for polyvinylidene difluoride having a smaller solubility of polyvinylidene difluoride than said organic solvent (C) into contact with said emulsion;
    wherein in said emulsion forming step polyvinylidene difluoride (A) and polymer (B) dissolve in said organic solvent (C) causing phase separation into two solution phases of:
        a first solution phase having said polyvinylidene difluoride (A) as its main component, and
        a second solution phase having said polymer (B) different from said polyvinylidene difluoride (A) as its main component, and
    wherein said organic solvent (C) comprises at least one of a ketone-based organic solvent, a nitrile-based organic solvent, and an ether-based organic solvent; and
    wherein in said particle forming step, the obtained polyvinylidene difluoride particles have:
        an average particle diameter of 0.3 μm or more and less than 100 μm;
        a particle diameter distribution index of 1-2; and
        a repose angle of less than 40°.

2. The method for producing polyvinylidene difluoride particles according to claim 1, wherein each solvent of two separated phases is the same.

3. The method for producing polyvinylidene difluoride particles according to claim 2, wherein said polymer (B) different from said polyvinylidene difluoride (A) is a thermoplastic resin.

4. The method for producing polyvinylidene difluoride particles according to claim 2, wherein said polymer (B) different from said polyvinylidene difluoride (A) dissolves in said poor solvent for polyvinylidene difluoride.

5. The method for producing polyvinylidene difluoride particles according to claim 2, wherein said polymer (B) different from said polyvinylidene difluoride (A) is a polyvinyl alcohol, a hydroxypropyl cellulose, a polyethylene oxide or a polyethylene glycol.

6. The method for producing polyvinylidene difluoride particles according to claim 1, wherein said polymer (B) different from said polyvinylidene difluoride (A) is a thermoplastic resin.

7. The method for producing polyvinylidene difluoride particles according to claim 6, wherein said polymer (B) different from said polyvinylidene difluoride (A) dissolves in said poor solvent for polyvinylidene difluoride.

8. The method for producing polyvinylidene difluoride particles according to claim 6, wherein said polymer (B) different from said polyvinylidene difluoride (A) is a polyvinyl alcohol, a hydroxypropyl cellulose, a polyethylene oxide or a polyethylene glycol.

9. The method for producing polyvinylidene difluoride particles according to claim 1, wherein said polymer (B) different from said polyvinylidene difluoride (A) dissolves in said poor solvent for polyvinylidene difluoride.

10. The method for producing polyvinylidene difluoride particles according to claim 1, wherein said polymer (B) different from said polyvinylidene difluoride (A) is a polyvinyl alcohol, a hydroxypropyl cellulose, a polyethylene oxide or a polyethylene glycol.

11. The method for producing polyvinylidene difluoride particles according to claim 1, wherein said poor solvent for polyvinylidene difluoride is water.

12. The method for producing polyvinylidene difluoride particles according to claim 1, wherein said organic solvent (C) is an ether-based organic solvent having a boiling point of 100° C. or more.

13. The method for producing polyvinylidene difluoride particles according to claim 12, wherein said organic solvent (C) is diethylene glycol dimethyl ether.

* * * * *

UNITED STATES PATENT AND TRADEMARK OFFICE
CERTIFICATE OF CORRECTION

PATENT NO. : 9,920,193 B2
APPLICATION NO. : 14/421304
DATED : March 20, 2018
INVENTOR(S) : Yuji Echigo et al.

It is certified that error appears in the above-identified patent and that said Letters Patent is hereby corrected as shown below:

On the Title Page

At item (30) Foreign Application Priority Data, change:
"August 26, 2013 (JP)"
To:
-- August 30, 2012 (JP) --

Signed and Sealed this
Twenty-sixth Day of June, 2018

Andrei Iancu
*Director of the United States Patent and Trademark Office*